Feb. 17, 1953          E. DYKE ET AL          2,629,048
APPARATUS FOR SELECTIVELY INTERCONNECTING WAVE GUIDES
Filed April 7, 1950          2 SHEETS—SHEET 1
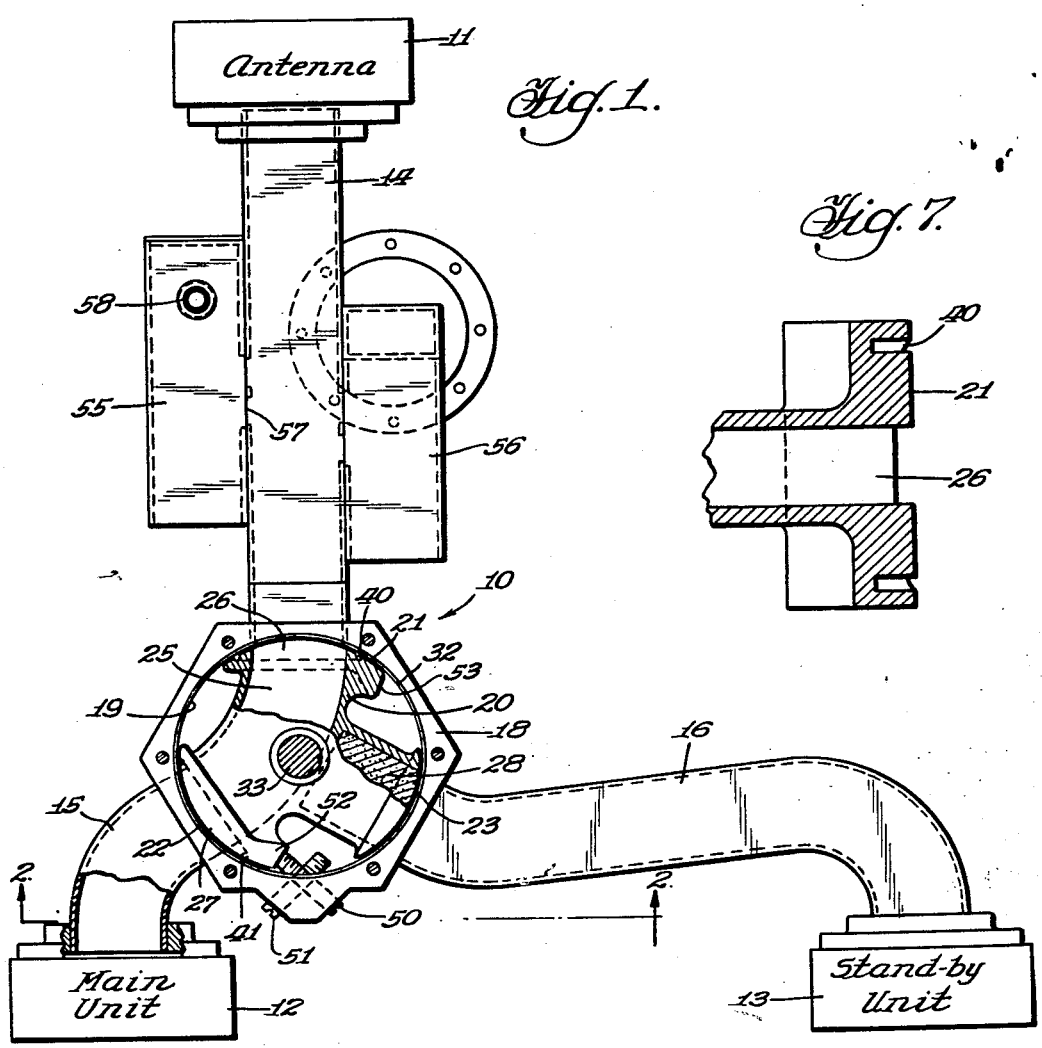
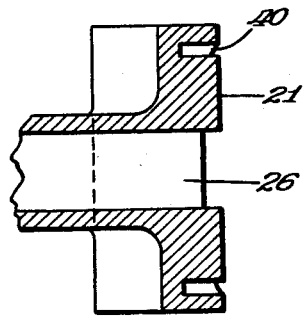
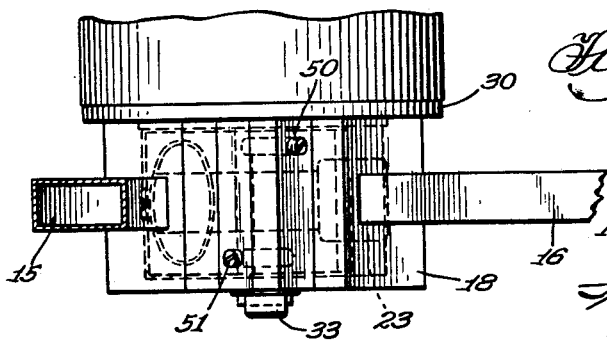
INVENTORS.
Edwin Dyke and
Richard Y. Hoffman, Jr.
BY
Tooman L. Mueller
Atty.

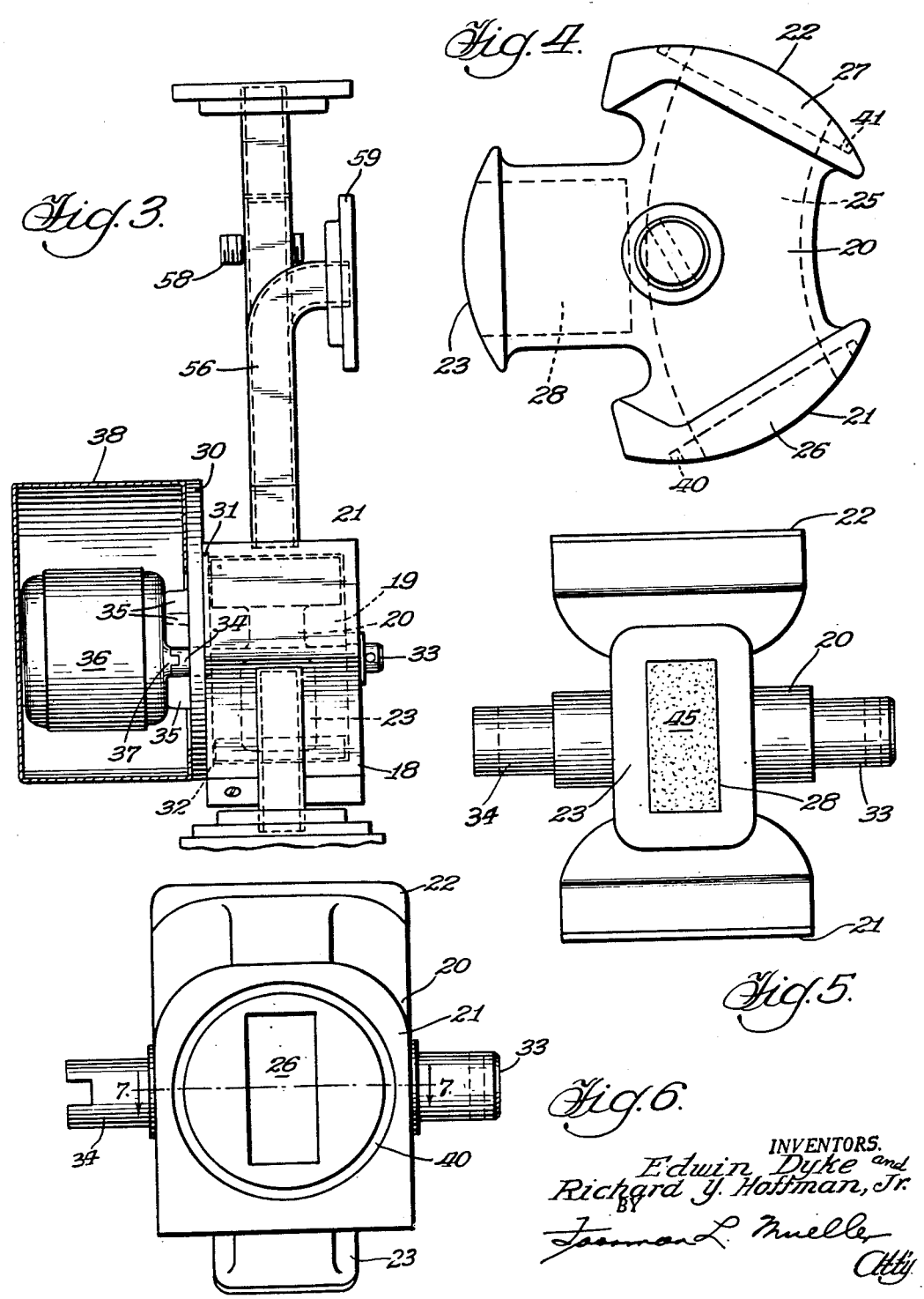

Patented Feb. 17, 1953

2,629,048

UNITED STATES PATENT OFFICE 2,629,048

APPARATUS FOR SELECTIVELY INTER-CONNECTING WAVE GUIDES

Edwin Dyke, Brookfield, and Richard Y. Hoffman, Jr., Northbrook, Ill., assignors to Motorola, Inc., Chicago, Ill., a corporation of Illinois Application April 7, 1950, Serial No. 154,696

16 Claims. (Cl. 250—17)

1

This invention relates generally to a junction device for interconnecting wave guides, and more particularly to a device which may be operated to selectively interconnect various wave guide branches and to terminate branches not interconnected, and which facilitates the testing of waves passing through the wave guide branches.

In microwave radio communication equipment, waves are transmitted from one device to another through hollow wave guides. It is necessary to provide junctions for interconnecting the various wave guides and in some applications it is desired to selectively interconnect various wave guide branches in different manners for different operations. As an example, in microwave relay installations it is often desired to provide spare or standby units which may be connected in the system in the event of failure of the regular or main units. Various means may be provided to determine when the regular equipment is not operating properly and under such condition to interconnect the spare or standby units in the system. In such installations, when the main unit fails, it is desirable to disconnect the main unit from the antenna and connect the standby unit thereto. As the interconnections between the units are made through wave guides, movable means for selectively interconnecting the various branches are required.

In the provision of a junction device for wave guides for selectively interconnecting various wave guide branches, it is necessary that the waves be transmitted through the device with slight attenuation so that there is no substantial power loss. Also it is desirable that the junction device may be remotely controlled as the equipment might be inaccessible, and it might be desirable to control the interconnections automatically. It is necessary that provisions be made for properly terminating branches not interconnected so that there will not be interference between waves from such branches and the waves being carried through the interconnected branches. To simplify the overall equipment it may also be desired to include provisions for monitoring and testing the waves on the branches connected to the junction means.

It is therefore an object of the present invention to provide an improved junction device for selectively interconnecting and terminating wave guide branches.

It is a further object of this invention to provide a junction device including movable members for selectively interconnecting wave guide branches which prevents the waves from passing between the movable members and thereby causing attenuation of the waves.

A still further object of this invention is to provide a compact wave guide junction assembly including provisions for interconnecting branch wave guides and for monitoring waves in the various branches.

It is another object of this invention to provide selective interconnecting devices for wave guides which may be remotely operated.

A feature of this invention is the provision of a selective junction device for wave guides including a housing with wave guide branches symmetrically arranged thereon and a rotor in the housing for selectively interconnecting and terminating the wave guide branches. The rotor has a passage therethrough for interconnecting wave guide branches and wave absorbing material for terminating branches not interconnected.

Another feature of this invention is the provision of a wave guide junction in the form of a single solder assembly which includes selective interconnecting means, terminating means and monitoring provisions.

Still another feature of this invention is the provision of a rotor for a wave guide junction assembly having a passage therethrough with spaced outlets and grooves about the outlets which present a shunt impedance to the wave transmitted that the wave will not pass between the rotor and the housing.

A further feature of this invention is the provision of a selective junction assembly including a housing with a cover plate, a rotor supported by the housing and cover plate, and a motor for driving the rotor mounted on the cover plate, so that by removal of the cover plate the entire unit may be disassembled.

Other objects and features will be apparent from the following description when taken in connection with the accompanying drawings in which:

Fig. 1 illustrates a wave guide junction assembly connected to an antenna, a main unit and a standby unit in a communication system;

Fig. 2 is a view of the assembly along the lines 2—2 of Fig. 1;

Fig. 3 is a side view of the junction assembly;

Figs. 4, 5 and 6 are detailed views of the rotor of the junction assembly; and

Fig. 7 is a cross sectional view along the lines 7—7 of Fig. 6.

In practicing the invention there is provided a wave guide junction assembly including wave guide branches for connection to communication devices such as an antenna, a main unit and a standby unit. The wave guide branches come together at a housing and are symmetrically positioned with respect to the housing. The housing has a cylindrical cavity therein in which is positioned a rotor having symmetrically spaced portions with cylindrical surfaces of the same diameter as the cavity to fit relatively closely therewith. A cover plate closes the opening and together with the housing supports the rotor for rotation. The cover plate also supports driving means for the rotor which may be remotely controlled. The rotor includes a passage having outlets which are positioned in said spaced portions of the rotor and a recess in another one of said portions. The rotor may be moved to positions in which the passage therein interconnects the wave guide branches connected to the main unit and the antenna or the wave guide branches connected to the standby unit and the antenna. Wave absorbing means is provided in the recess in the rotor which will be positioned adjacent the wave guide branch which is not interconnected for terminating the same. Grooves are provided in the rotor portions about the outlets which form quarter wave shorted stubs and therefore present such impedances to waves that the waves will not pass between the rotor and the housing and thereby be attenuated. Adjustable stops may be provided in the housing to permit accurate positioning of the rotor. Monitoring provisions may be provided on the wave guide branches connected to the housing so that the junction assembly may serve as a compact unit for interconnecting, terminating and monitoring various wave guide branches.

Referring now to the drawings, in Figs. 1, 2 and 3 there is illustrated the junction assembly 10 connected to an antenna 11, a main unit 12 and a standby unit 13 of a communication system. The assembly includes wave guide branches 14, 15 and 16 individually connected to the antenna and the units. The wave guide branches are all connected to a housing 18 having a cylindrical opening or cavity 19 therein. Positioned within the cavity is a rotor 20 having portions 21, 22 and 23 with surfaces which conform to the cylindrical surface of the cavity 19 and are spaced therefrom to provide a small clearance therebetween. A passage 25 extends between the portions 21 and 22 and includes outlets 26 and 27 at the surfaces thereof. The rotor also includes a recess 28 in the portion 23 opening at the surface thereof. In the position of the rotor shown, the passage 25 joins the wave guide branches 14 and 15 and the recess 28 is adjacent the wave guide branch 16.

As shown in Figs. 2 and 3, a cover plate 30 is provided for the housing 18 and closes the opening 19. The cover plate 30 includes an offset portion 31 extending into a recess 32 at the end of the cavity 19 for positioning the cover plate with respect to the housing. The rotor 20 includes extending shaft portions 33 and 34 which are supported in bearings in the housing 18 and the cover plate 30, respectively, to provide a pivotal mounting for the rotor. The cover plate has studs 35 formed thereon for supporting a motor 36. The motor includes a drive shaft 37 engaging the shaft 34 for driving the rotor 20. A protecting cover 38 for the motor may also be supported on the cover plate 30.

The detailed structure of the rotor 20 is apparent from a consideration of Figs. 4, 5, 6 and 7. As previously stated, the rotor includes portions 21, 22 and 23 with a passage 25 connecting the portions 21 and 22 and having outlets 26 and 27 at the surfaces thereof. In Fig. 6 the surface of portion 21 is shown in plan view. The surface of the portion 22 may be identical but is reversed with respect to the portion 21. Positioned about the outlet 26 in the portion 21 is a groove 40. From a comparison of Figs. 4 and 7 it will be noted that the groove 40 is of varying depth because of the curved configuration of the surface of the portion 21. The groove 40 forms, in effect, a choke which enhances the passage of the wave along the desired path between the wave guide branch 14 and the passage 25 of the rotor. When the rotor is positioned in the housing, the groove 40 together with the path between the surface of the portion 21 and the housing presents such an impedance to waves transmitted through the guide that the waves will easily pass along the guide and will not be substantially diverted in the space between the housing and the rotor. This action results generally as the groove reflects high impedance toward the narrow walls of the wave guide and reflects a substantially short circuit toward the broad walls. As previously stated, there must be clearance between the surface of portion 21 and the rotor to provide easy rotation of the rotor. The action of the choke prevents substantial diversion of the waves through this clearance. A groove 41 is provided on the surface of the portion 22 and may be identical in every respect to the groove 40.

As previously stated, a recess 28 is provided in the rotor opening in the surface portion 23. This recess is filled with wave absorbing material 45 and thereby serves as a termination for the wave guide branch not interconnected. A polyiron composition or various other materials may be used as the wave absorbing material. In the position of the rotor shown in Fig. 1, the recess 28 is positioned adjacent wave guide branch 16 so that the wave absorbing material 45 will absorb any waves being radiated by the standby unit. When the rotor is positioned to interconnect wave guide branches 14 and 16 to connect the standby unit to the antenna, the recess 28 will be positioned adjacent wave guide branch 15 so that the polyiron material 45 will absorb any waves being radiated by the main unit. In the normal operation of the system, the unit which is not connected to the antenna will be deenergized so that no waves will be radiated thereby. However, it may be desired to test the unit not being connected to the antenna and in such case the polyiron material will serve as a dummy antenna for absorbing the waves radiated by the unit permitting the unit to be tested.

As previously stated, a motor 36 is mounted on the cover plate 30 for the housing and is connected to the shaft 34 of the rotor 20 for moving the rotor. The motor 36 may be reversible and may be remotely controlled to move the rotor to either of the two operative positions. To permit accurate positioning of the rotor in these two positions, adjustable stops 50 and 51 are provided. The stop 50 is positioned to engage the shoulder 52 on the rotor portion 22 to limit movement of the rotor so that the passage 25 thereof is properly positioned to interconnect wave guide branches 14 and 15. When the rotor 20 is rotated in a clockwise direction the shoulder 52 will be moved away from the stop 50 and the shoulder 53 extending from the rotor portion 21 will engage the stop 51 to limit movement of the rotor so that the passage 25 interconnects wave guide branches 14 and 16. The stops 50 and 51 are adjustable so that the positions of the rotor can be varied slightly to provide the best operative interconnection of the wave guide branches. It will be apparent from Fig. 2 that the stops 50 and 51 are positioned at the edges of the housing and the portion 23 of the rotor does not extend to the edges so that this portion does not engage the stops but rotates freely past the stops in either direction.

It may be desired to monitor waves passing through one or more of the wave guide branches of the junction assembly and in order to accomplish this auxiliary wave guide sections may be connected to the wave guide branches by directional couplers. Wave guide sections 55 and 56 are illustrated in Fig. 1 for such purposes. The wave guide section 55 is connected by directional coupler 57 to wave guide branch 14. The coupler is arranged so that waves passing from the junction toward the antenna are partially diverted to the section 55. A detector unit 58 may be provided in the section 55 for monitoring the waves passing through the wave guide branch 14 in this direction, as for example to indicate the power of the wave being applied to the antenna. The wave guide section 56 may be curved as shown in Fig. 3 and have a test flange 59 secured thereto. This test flange facilitates the securing of a signal generator or other item of test equipment to the section 56.

Although the junction assembly has been shown as including three wave guide branches and a rotor for selectively interconnecting two of the branches and for terminating the third branch. it will be apparent that similar structures can be provided for interconnecting larger numbers of wave guide branches and/or for terminating larger numbers of wave guide branches. The test and monitoring provisions are shown attached to a particular wave guide branch but it is obvious that similar monitoring and/or test provisions can be provided on any one of the branches or on a plurality of the wave guide branches. The configuration of the branches can be changed to meet any particular application and the construction of the branches extending from the housing should be in accordance with well known design principles. It is to be pointed out that the junction device is not limited to use with wave guides for microwave frequencies but may be used with hollow guides which may be used in various ways.

It it seen from the above that there is provided a relatively simple junction assembly for selectively interconnecting wave guide branches and for terminating branches not interconnected. The interconnection is provided without substantial diversion of waves through undesired paths and therefore very little attenuation of the waves results. Branches not used are terminated so that the waves therefrom will not interfere with the waves in the interconnected branches. Also monitoring and test provisions may be included on the assembly so that a compact overall unit is provided which performs the functions of interconnecting and terminating wave guide branches and facilitating the testing and monitoring of equipment connected thereto.

Although there are illustrated certain embodiments of the invention which are illustrative thereof, it is obvious that various changes and modifications can be made therein without departing from the intended scope of the invention as defined in the appended claims.

We claim:

1. In a microwave communication system which includes a main unit, a standby unit and an antenna, wave guide means for selectively connecting said main unit and said standby unit to said antenna comprising in combination, a stationary housing having a cavity therein, a plurality of wave guide branches individually connected to said units and said antenna and symmetrically positioned about said housing in communication with said cavity therein, a rotor within said cavity having a passage therethrough with outlets at either end, said rotor having a recess therein spaced from said outlets, said outlets and said recess being symmetrically positioned about the outside of said rotor, means mounting said rotor in said housing for movement from a first position in which said passage interconnects said wave guide branches connected to said antenna and said main unit and said recess is adjacent said wave guide branch connected to said standby unit, to a second position in which said passage interconnects said wave guide branches connected to said antenna and said standby unit and said recess is adjacent said wave guide branch connected to said main unit, and wave absorbing means in said recess forming a matched impedance termination for the wave guide branch connected thereto.

2. In a microwave communication system which includes a main unit, a standby unit and an antenna, wave guide means for selectively connecting said main unit and said standby unit to said antenna comprising in combination, a stationary housing including a block having a cavity therein and a cover plate therefor, a plurality of wave guide branches individually connected to said units and said antenna and symmetrically positioned about said housing in communication with said cavity therein, a rotor within said cavity having a passage therethrough with outlets at either end and having a recess therein spaced from said outlets, said outlets and said recess being symmetrically positioned about the outside of said rotor, said rotor having shaft portions extending therefrom, said block and said cover plate having bearings therein for receiving said shaft portions for mounting said rotor in said housing for movement from a first position in which said passage provides connection between said wave guide branches connected to said antenna and said main unit and said recess is adjacent to said wave guide branch connected to said standby unit, to a second position in which said passage provides connection between said wave guide branches connected to said antenna and said standby unit and said recess is adjacent to said wave guide branch connected to said main unit, and wave absorbing means in said recess forming a matched impedance termination for the wave guide branch connected thereto.

3. In a microwave communication system which includes a main unit, a standby unit and an antenna, wave guide means for selectively connecting said main unit and said standby unit to said antenna comprising in combination, a stationary housing having a cavity therein with a cylindrical surface, a plurality of hollow wave guide branches comprising external conductors only individually connected to said units and said antenna and symmetrically positioned about said housing in communication with said opening therein, a rotor in said cavity having three symmetrically positioned surface portions fitting closely within said cylindrical surface, said rotor having a hollow passage therethrough with outlets in two of said surface portions and a recess in the third surface portion, means mounting said rotor in said housing for movement from a first position in which said passage provides connection between said wave guide branches connected to said antenna and said main unit and said recess is adjacent said wave guide branch connected to said standby unit, to a second position in which said passage provides connection between said wave guide branches connected to said antenna and said standby unit and said recess is adjacent said wave guide branch connected to said main unit, said surface portions about said outlets having grooves therein which present a high impedance to waves passing about said outlets between said rotor and said housing, and wave absorbing means in said recess forming a matched impedance termination for the wave guide branch connected thereto.

4. In a microwave communication system which includes a main unit, a standby unit and an antenna, wave guide means for selectively connecting said main unit and said standby unit to said antenna comprising in combination, a stationary housing having a cavity therein with a cylindrical surface, a plurality of wave guide branches individually connected to said units and said antenna and symmetrically positioned about said housing in communication with said opening therein, a rotor in said cavity having three symmetrically positioned surface portions fitting closely within said cylindrical surface, said rotor having a passage therethrough with outlets in two of said surface portions and a recess in the third surface portion, and wave absorbing means in said recess for absorbing waves applied thereto and for thereby providing a matched impedance termination for the wave guide branch connected thereto, means mounting said rotor in said housing for movement from a first position in which said passage provides connection between said wave guide branches connected to said antenna and said main unit and said recess is adjacent said wave guide branch connected to said standby unit, to a second position in which said passage provides connection between said wave guide branches connected to said antenna and said standby unit and said recess is adjacent said wave guide branch connected to said main unit, and stop means secured to said housing for limiting movement of said rotor between said first and second positions.

5. Wave guide means for selectively interconnecting a plurality of units of a communication system including in combination, a housing having a cylindrical cavity therein, a plurality of wave guide branches individually connected to said units and symmetrically positioned about said housing in communication with said opening therein, a rotor in said housing having surface portions fitting closely within said cylindrical opening, said rotor having a passage therethrough with outlets in certain of said surface portions and a recess in another one of said surface portions, said outlets and said recess being symmetrically positioned about the surface of said rotor, means mounting said rotor in said housing for movement to positions in which said passage provides connection between certain of said wave guide branches and said recess is adjacent another one of said wave guide branches, said surface portions about said outlets having grooves therein of such configuration to enhance the passage of waves between said wave guide branches and said passage and present a high impedance to waves passing in the clearance between said rotor and said housing about said outlets, and wave absorbing means in said recess forming a matched impedance termination for the wave guide branch connected thereto.

6. In a microwave communication system which includes a main unit, a standby unit and an antenna, wave guide means for selectively connecting said main unit and said standby unit to said antenna comprising in combination, a stationary housing having a cavity therein, a plurality of wave guide branches individually connected to said units and said antenna and symmetrically positioned about said housing in communication with said cavity therein, means connected to at least one of said wave guide branches for determining a characteristic of waves passing therethrough, a rotor within said cavity having a passage therethrough with outlets at either end, said rotor having a recess therein spaced from said outlets, said outlets and said recess being symmetrically positioned about the surface of said rotor, means mounting said rotor in said housing for movement from a first position in which said passage provides connection between said wave guide branches connected to said antenna and said main unit and said recess is adjacent said wave guide branch connected to said standby unit, to a second position in which said passage provides connection between said wave guide branches connected to said antenna and said standby unit, and said recess is adjacent to said wave guide branch connected to said main unit, and wave absorbing means in said recess forming a matched impedance termination for the wave guide branch connected thereto.

7. Wave guide means for selectively interconnecting a plurality of units of a communication system including in combination, a stationary housing having a cylindrical cavity therein, a plurality of wave guide branches individually connected to said units and symmetrically positioned about said housing in communication with said cavity therein, means connected to at least one of said wave guide branches for determining a characteristic of waves passing therethrough, a rotor within said cavity having a plurality of symmetrically positioned portions with cylindrical surfaces fitting closely said cylindrical surface of said cavity, said rotor having a passage therethrough and having a recess therein, said passage having outlets in certain of said cylindrical surfaces and said recess having an opening in another one of said cylindrical surfaces, means mounting said rotor in said housing for movement to positions in which said passage provides connection between certain of said wave guide branches and said recess is adjacent another one of said wave guide branches, and wave absorbing means in said recess forming a matched impedance termination for the wave guide branch connected thereto.

8. Wave guide means for selectively interconnecting a plurality of devices in a communication system, including in combination, a stationary housing having a cavity therein with a cylindrical surface, a plurality of hollow wave guide branches comprising external conductors only individually connected to said devices and extending to symmetrically positioned openings in said cylindrical surface in communication with said cavity therein, a rotor within said cavity having a plurality of symmetrically positioned surface portions engaging said cylindrical surface of said cavity, said rotor having at least one hollow passage therethrough with outlets at said surface portions and having at least one surface portion spaced from said outlets formed of wave absorbing material, means mounting said rotor in said housing for movement to positions in which said passage provides connection between a plurality of said wave guide branches and said wave absorbing material is adjacent another one of said wave guide branches for providing a matched termination impedance therefor.

9. Wave guide means for selectively interconnecting a plurality of devices in a communication system, including in combination, a stationary housing having a cavity therein with a cylindrical surface, a plurality of wave guide branches individually connected to said devices and extending to symmetrically positioned openings in said cylindrical surface in communication with said cavity therein, a rotor within said cavity having a plurality of symmetrically positioned surface portions engaging said cylindrical surface of said cavity, said rotor having a passage therethrough with outlets at said surface portions and having a recess therein opening in a surface portion spaced from said outlets, wave absorbing means in said recess, means mounting said rotor in said housing for movement to positions in which said passage provides connection between a plurality of said wave guide branches and said wave absorbing means is adjacent another one of said wave guide branches for providing a matched termination impedance therefor.

10. Wave guide means for selectively interconnecting a plurality of devices in a communication system including in combination, a stationary housing having a cavity therein, a plurality of hollow wave guide branches comprising external conductors only individually connected to said devices and extending to openings in said housing in communication with said cavity therein, a rotor within said cavity having a plurality of portions with surfaces engaging the surface of said cavity, said rotor having a hollow passage therethrough with outlets at said surfaces of said portions, one of said portions being formed of wave absorbing material, means mounting said rotor in said housing for movement to positions in which said passage provides connection between a plurality of said wave guide branches and said wave absorbing material is adjacent another one of said wave guide branches for providing a matched termination impedance therefor.

11. Wave guide means for selectively interconnecting a plurality of devices in a communication system including in combination, a stationary housing having a cavity therein, a plurality of wave guide branches individually connected to said devices and extending to openings in said housing in communication with said cavity therein, a movable member within said cavity having a plurality of portions with surfaces closely engaging the surface of said cavity, said movable member having a passage therethrough with outlets at said surfaces of certain of said portions and having another portion spaced from said outlets formed of wave absorbing material, means mounting said member in said housing for movement to positions in which said passage provides connection between a plurality of said wave guide branches and said wave absorbing material is adjacent another one of said wave guide branches for providing a matched termination impedance therefor.

12. Wave guide means for selectively interconnecting a plurality of devices in a communication system including in combination, a stationary housing including a block having a cavity therein with a cylindrical surface and a cover plate therefor, a plurality of wave guide branches individually connected to said devices and extending to openings in said block in communication with said cavity therein, a rotor having shaft portions extending therefrom for mounting the same within said cavity, said block and said cover plate having bearing means for said shaft portions, said rotor having a plurality of surface portions engaging the surface of said cavity and having a passage therethrough with outlets at certain of said surface portions, another one of said surface portions being formed of wave absorbing material, and motor means mounted on said cover plate and engaging one of said shaft portions for moving said rotor to positions in which said passage provides connection between a plurality of said wave guide branches and said wave absorbing material is adjacent another one of said wave guide branches for providing a matched termination impedance therefor.

13. Wave guide means for selectively interconnecting a plurality of devices in a communication system including in combination, a stationary housing including a block having a cavity therein with a cylindrical surface and a cover plate therefor, a plurality of wave guide branches individually connected to said devices and extending to openings in said block in communication with said cavity therein, a rotor having shaft portions extending therefrom for mounting the same within said cavity, said block and said cover plate having bearings for said shaft portions, said rotor having a plurality of surface portions engaging the surface of said cavity and having a passage therethrough with outlets at certain of said surface portions, another one of said surface portions being formed of wave absorbing material, said rotor being movable with respect to said housing to positions in which said passage provides connection between a plurality of said wave guide branches and said wave absorbing material is adjacent another one of said wave guide branches for providing a matched termination impedance therefor.

14. Wave guide means for selectively interconnecting a plurality of devices in a communication system including in combination, a stationary housing having a cavity therein with a cylindrical surface, a plurality of hollow wave guide branches comprising external conductors only individually connected to said devices and extending to openings in said housing in communication with said cavity therein, a rotor having shaft portions extending therefrom for mounting the same within said cavity, said housing having bearing means for said shaft portions, said rotor having a plurality of surface portions engaging the surface of said cavity and having a hollow passage therethrough with outlets at certain of said surface portions, another one of said surface portions being formed of wave absorbing material, and motor means mounted on said housing and engaging one of said shaft portions for moving said rotor to positions in which said passage provides connection between a plurality of said wave guide branches and said wave absorbing material is adjacent another one of said wave guide branches for providing a matched termination impedance therefor.

15. Wave guide means for selectively interconnecting a plurality of devices in a communication system including in combination, a stationary housing including a block having a cavity therein with a cylindrical surface and a cover plate therefor, a plurality of wave guide branches individually connected to said devices and extending to openings in said block in communication with said cavity therein, a rotor having shaft portions extending therefrom for mounting the same within said cavity, said block and said cover plate having bearing means for said shaft portions, said rotor having a plurality of surface portions engaging the surface of said cavity and having a passage therethrough with outlets at certain of said surface portions, another one of said surface portions being formed of wave absorbing material, motor means mounted on said cover plate and engaging one of said shaft portions for moving said rotor to predetermined positions in which said passage provides connection between a plurality of said wave guide branches and said wave absorbing material is adjacent another one of said wave guide branches for providing a matched termination impedance therefor, and stop means adjustably positioned in said block for facilitating the positioning of said rotor in said predetermined positions.

16. Wave guide means for selectively interconnecting a plurality of units of a communication system including in combination, a stationary housing having a cylindrical cavity therein, a plurality of wave guide branches individually connected to said units and symmetrically positioned about said housing in communication with said opening therein, a rotor in said housing having curved surface portions fitting closely within said cylindrical opening, said rotor having a passage therethrough with outlets in certain of said surface portions and a recess in another one of said surface portions, said wave guide branches and said passage having rectangular cross section with relatively narrow walls and relatively broad walls, said outlets and said recess being symmetrically positioned about the surface of said rotor, means mounting said rotor in said housing for movement to positions in which said passage provides connection between certain of said wave guide branches and said recess is adjacent another one of said wave guide branches, said curved surface portions about said outlets having circular grooves therein which reflect high impedance toward said narrow walls and substantially a short circuit toward said broad walls so that low impedance is presented to waves passing along said wave guide branches and said passage and high impedance is presented to waves passing between said rotor and said housing about said outlets, and wave absorbing means in said recess for absorbing waves applied thereto.

EDWIN DYKE.
RICHARD Y. HOFFMAN, Jr.

REFERENCES CITED

The following references are of record in the file of this patent:

UNITED STATES PATENTS

| Number | Name | Date |
| --- | --- | --- |
| 2,344,780 | Kram et al. | Mar. 21, 1944 |
| 2,423,508 | Leck | July 8, 1947 |
| 2,427,940 | Ayres | Sept. 23, 1947 |